(12) United States Patent
Watanabe

(10) Patent No.: US 8,743,409 B2
(45) Date of Patent: Jun. 3, 2014

(54) INFORMATION PROCESSING APPARATUS AND METHOD OF PROCESSING INFORMATION

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 111 days.

(21) Appl. No.: 13/222,403

(22) Filed: Aug. 31, 2011

(65) Prior Publication Data

US 2012/0057182 A1  Mar. 8, 2012

(30) Foreign Application Priority Data

Sep. 6, 2010  (JP) .................................. 2010-199142

(51) Int. Cl.
*G06F 3/12* (2006.01)
*G06K 15/00* (2006.01)
*H04N 1/00* (2006.01)
*H04N 1/40* (2006.01)

(52) U.S. Cl.
USPC ........ 358/1.16; 358/1.15; 358/1.17; 358/401; 358/444

(58) Field of Classification Search
USPC ......... 358/1.13, 1.16, 1.15, 404, 426.07, 444, 358/401, 1.17, 534, 3.26, 501, 508, 524, 358/528, 476, 3.23; 705/7.12, 7.13, 7.23, 705/7.26, 7.27; 707/609, 659, 669, 674, 707/711, 790, 791, 799, 805, 821
See application file for complete search history.

(56) References Cited

U.S. PATENT DOCUMENTS

| 6,870,634 B1 * | 3/2005 | Morikawa | .................... 358/1.16 |
| 2006/0227373 A1 * | 10/2006 | Matoba | ........................ 358/1.15 |

FOREIGN PATENT DOCUMENTS

JP  2008-219146 A  9/2008

* cited by examiner

*Primary Examiner* — Ngon Nguyen
(74) *Attorney, Agent, or Firm* — Kubotera & Associates, LLC

(57) ABSTRACT

An information processing apparatus includes a receiving unit for receiving data; a printing unit for printing the data; a data storage unit for storing the data; a print setting storage unit for storing a print enable setting indicating whether the data received with the receiving unit is printed; and a print control unit for controlling the printing unit to print the data stored in the data storage unit when the print enable setting is not set to print the data and it is determined that a remaining storage capacity of the data storage unit is not sufficient.

28 Claims, 8 Drawing Sheets

INFORMATION PROCESSING APPARATUS AND METHOD OF PROCESSING INFORMATION

BACKGROUND OF THE INVENTION AND RELATED ART STATEMENT

The present invention relates to an information processing apparatus and a method of processing information. More specifically, the present invention relates to an information processing apparatus capable of receiving, storing, and printing data.

A conventional multifunction device is capable of functioning as a facsimile. For example, Patent Reference has disclosed such a conventional multifunction device capable of transmitting image data such as an original retrieved in advance to a designated destination at a specific transmission time.

Patent Reference: Japanese Patent Publication No. 2008-219146

In the conventional multifunction device with the facsimile function, if the storage capacity of the memory becomes full, it is not possible to store newly received image data, thereby making it impossible to print or store the newly received image data.

In view of the problems described above, an object of the present invention is to provide an information processing apparatus capable of solving the problems of the conventional information processing apparatus. In the present invention, even when the information processing apparatus is set to store received data in a memory, it is possible to prevent a storage capacity of the memory from running out. Accordingly, it is possible to prevent newly received data from not being stored or printed.

Further objects and advantages of the invention will be apparent from the following description of the invention.

SUMMARY OF THE INVENTION

In order to attain the objects described above, according to an aspect of the present invention, an information processing apparatus includes a receiving unit for receiving data; a printing unit for printing the data; a data storage unit for storing the data; a print setting storage unit for storing a print enable setting indicating whether the data received with the receiving unit is printed; and a print control unit for controlling the printing unit to print the data stored in the data storage unit when the print enable setting is not set to print the data and it is determined that a remaining storage capacity of the data storage unit is not sufficient.

In the present invention, when the information processing apparatus is configured to store received data in a memory, it is possible to prevent a storage capacity of the memory from running out. Accordingly, it is possible to prevent newly received data from not being stored or printed.

DETAILED DESCRIPTION OF PREFERRED EMBODIMENTS

Hereunder, embodiments of the present invention will be explained with reference to the accompanying drawings.

First Embodiment

Figure 1:
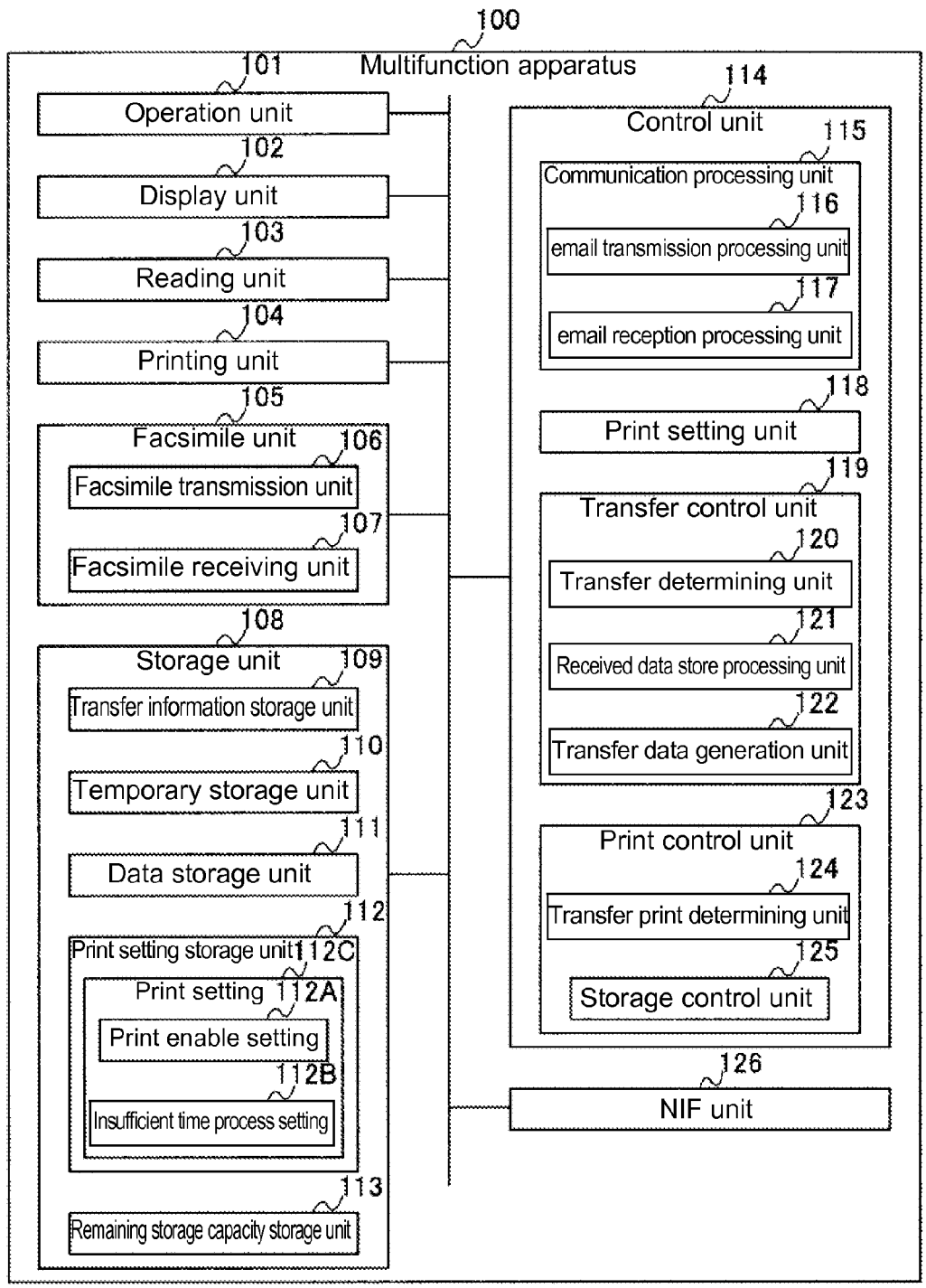
FIG. 1 is a block diagram showing a configuration of a multifunction apparatus according to a first embodiment of the present invention.

A first embodiment of the present invention will be explained. FIG. 1 is a block diagram showing a configuration of a multifunction apparatus 100 according to the first embodiment of the present invention.

In the embodiment, the multifunction apparatus 100 is a multifunction peripheral (MFP) and has a plurality of functions such as a scanner, a copier, a printer, a facsimile, or an email transmission. Further, the multifunction apparatus 100 is capable of transmitting and receiving data through a network such as Internet, and transmitting and receiving data through a communication network such as a public telephone communication network.

As shown in FIG. 1, the multifunction apparatus 100 includes an operation unit 101; a display unit 102; a reading unit 103; a printing unit 104; a facsimile unit 105; a storage unit 108; a control unit 114; and a network interface unit (referred to as an NIF unit) 126.

In the embodiment, the operation unit 101 has a plurality of keys and receives various instructions and input of a text and a number through an operation of a user. The display unit 102 is provided for displaying an input menu for the user and an image indicating information regarding received image and the like.

In the embodiment, the reading unit 103 is provided for optically reading an image such as a photograph, a text, a picture and the like from an original. The reading unit 103 includes, for example, a flat bed, an automatic document feeder, an original placing portion, and a discharging portion. The printing unit 104 is provided for printing an image on a recording sheet according to image data.

In the embodiment, the facsimile unit 105 is provided for performing a process of transmitting and receiving facsimile data included in the image data through the communication network. The facsimile unit 105 includes, for example, a facsimile transmission unit 106 for transmitting the facsimile data to the communication network and a facsimile receiving unit 107 as a receiving unit for receiving the facsimile data from the communication network. The facsimile receiving unit 107 is provided for specifying transmission origination information indicating a transmission origination of the facsimile data from a facsimile communication sequence signal.

In the embodiment, the storage unit 108 includes a transfer information storage unit 109, a temporary storage unit 110, a data storage unit 111, a print setting storage unit 112, and a remaining storage capacity storage unit 113.

Figure 2:
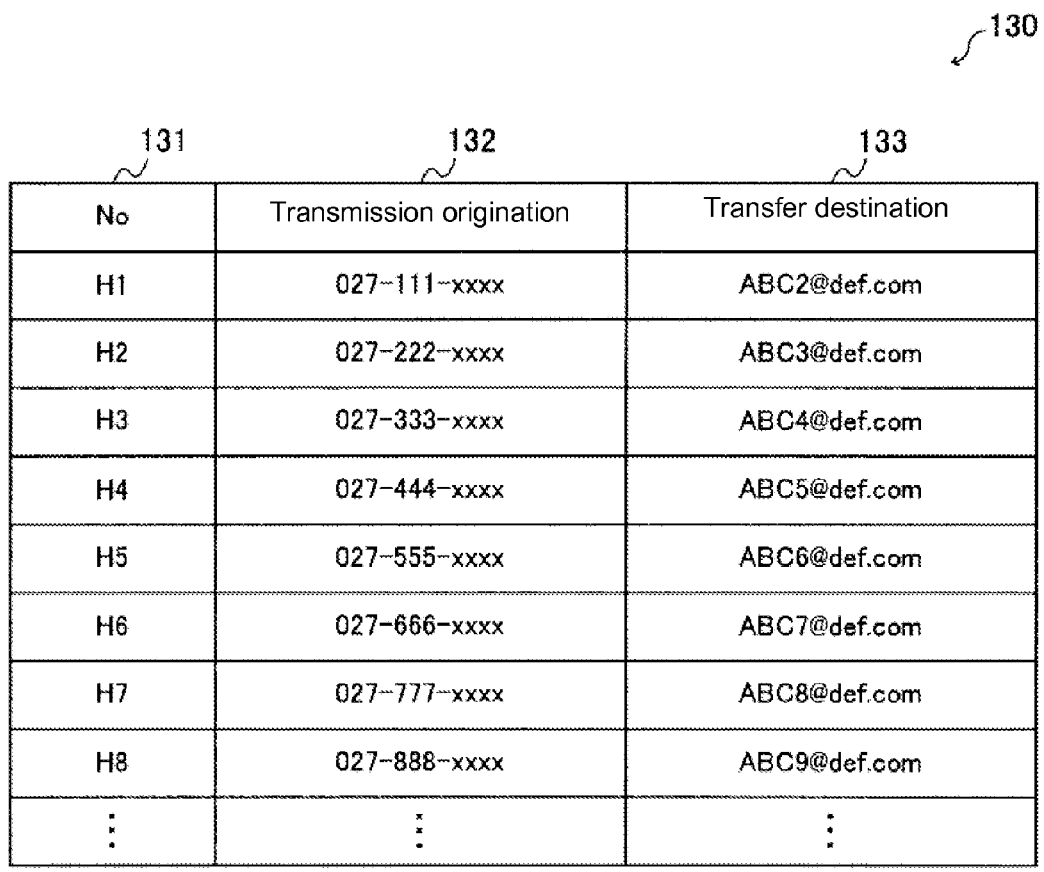
FIG. 2 is a schematic view showing a transfer information table of the multifunction apparatus according to the first embodiment of the present invention.

In the embodiment, the transfer information storage unit 109 is provided for storing transfer information indicating the transmission origination of the facsimile data and a transfer destination to which the facsimile data transmitted from the transmission origination is transferred using an email. For example, the transfer information is information with a table format as shown in FIG. 2. FIG. 2 is a schematic view showing a transfer information table 130 of the multifunction apparatus 100 according to the first embodiment of the present invention.

As shown in FIG. 2, the transfer information table 130 includes a number column 131, a transmission origination column 132, and a transfer destination column 133. The number column 131 stores identification information for identifying each record. The transmission origination column 132 stores transmission origination identification information for identifying the transmission origination of the facsimile data. For example, the transmission origination identification information may be a telephone number of the transmission origination. The transfer destination column 133 stores transfer destination identification information for identifying the transfer destination to which the facsimile data is transferred using the email. For example, the transfer destination identification information may be an email address of the transfer destination.

With reference to FIG. 1, in the embodiment, the temporary storage unit 110 is provided for temporarily storing the facsimile data received with the facsimile receiving unit 107. The data storage unit 111 is provided for receiving the facsimile data stored in the temporary storage unit 110, and storing the facsimile data. The print setting storage unit 112 is provided for storing a print setting 112C. The print setting 112C includes a print enable setting 112A indicating whether the image of the image data included in the facsimile data received with the facsimile receiving unit 107 is to be printed. The print setting 112C further includes an insufficient time process setting 112B indicating a process when the print enable setting 112A is set to not print the image data and a remaining storage capacity of the data storage unit 111 is insufficient.

In the embodiment, for example, the insufficient time process setting 112B may be information indicating one of a 1job setting and an nJob setting. The 1job setting indicates that the image of the image data contained in a 1job portion of the facsimile data stored in the data storage unit 111 is printed. The nJob setting indicates that the image of the image data contained in an njob portion of the facsimile data stored in the data storage unit 111 is printed. An n of the nJob is a natural number greater than two, and the user of the multifunction apparatus 100 selects the number. The 1Job represents a print job of printing the image of the image data contained in one mail portion of the facsimile data thus received. The nJob represents a print job of printing the image of the image data contained in n mail portions of the facsimile data thus received.

In the embodiment, the remaining storage capacity storage unit 113 is provided for storing remaining storage capacity information indicating a remaining storage capacity capable of being stored in the data storage unit 111. For example, the remaining storage capacity may be calculated by subtracting a total storage capacity of the facsimile data already stored in the data storage unit 111 from a total maximum storage capacity the data storage unit 111 is capable of storing.

In the embodiment, the control unit 114 includes a communication processing unit 115, a print setting unit 118, a transfer control unit 119, and a print control unit 123. The communication processing unit 115 is provided for controlling a process of transmitting and receiving the email through the NIF unit 126. The communication processing unit 115 includes, for example, an email transmission processing unit 116 for controlling a process of transmitting the email through the NIF unit 126, and an email reception processing unit 117 for controlling a process of receiving the email through the NIF unit 126.

In the embodiment, the print setting unit 118 is provided for controlling a process of generating or updating the print setting 112C, and storing the print setting 112C in the print setting storage unit 112. The print setting unit 118 displays, for example, a print setting screen on the display unit 102. The user selects whether the image of the image data contained in the facsimile data is to be printed, and inputs the process when the remaining storage capacity is insufficient through the print setting screen. More specifically, the print setting unit 118 is arranged to prompt the user to select whether the image of the image data contained in the facsimile data is to be printed, select whether the 1job portion or the nJob portion is printed when the remaining storage capacity is insufficient, and input the value of n when the nJob portion is printed through the print setting screen and the operation unit 101. According to the input of the user, the print setting unit 118 generates or updates the print setting 112C.

Accordingly, the user can set that the 1Job portion is printed among a plurality of jobs stored in the data storage unit 111. As a result, it is possible to reduce the number of print sheets to be printed and output when the remaining storage capacity is insufficient, thereby conserving the print sheets. Further, the user also can set that the nJob portion is printed among a plurality of jobs stored in the data storage unit 111. As a result, it is possible for the user to set the number of print sheets to be printed and output when the remaining storage capacity is insufficient. In other words, the user can control the number of print sheets according to user's purpose.

In the embodiment, the transfer control unit 119 performs a process of transferring the facsimile data transmitted from the transmission origination to the transfer destination, and of storing the facsimile data thus received in the temporary storage unit 110. The transfer control unit 119 includes, for example, a transfer determining unit 120, a received data store processing unit 121, and a transfer data generation unit 122.

Figure 3:
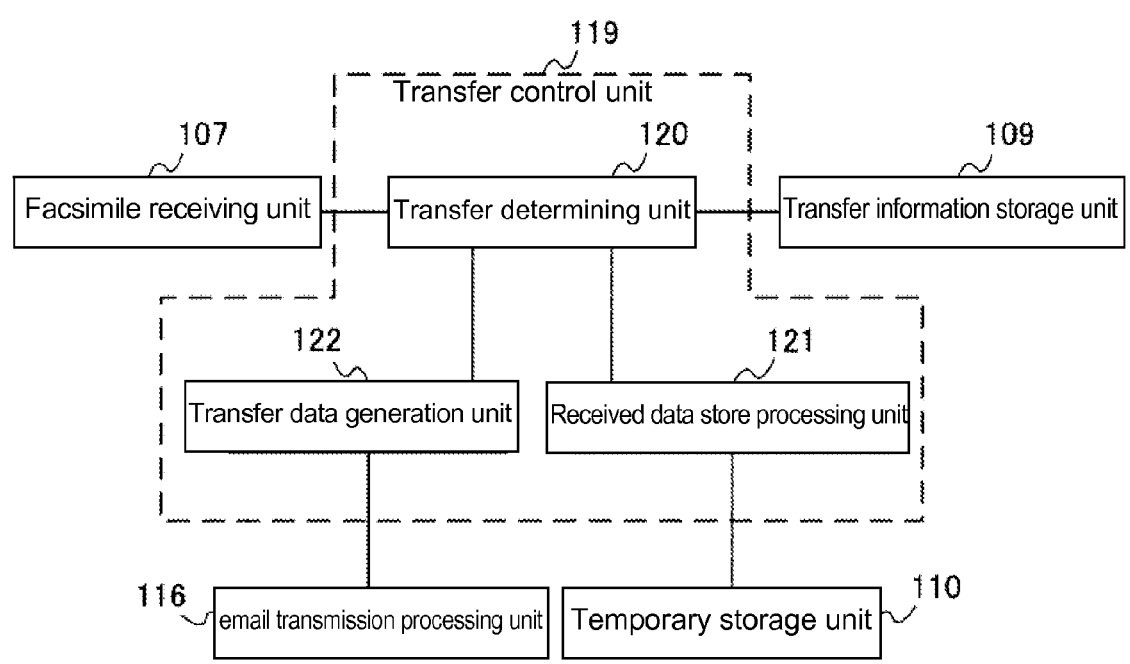
FIG. 3 is a block diagram showing a configuration of a transfer control unit of the multifunction apparatus according to the first embodiment of the present invention.

An operation of the transfer control unit 119 will be explained next with reference to FIG. 3. FIG. 3 is a block diagram showing a configuration of the transfer control unit 19 of the multifunction apparatus 100 according to the first embodiment of the present invention.

In the embodiment, when the email reception processing unit 117 receives the facsimile data, the transfer determining unit 120 retrieves the transmission origination information indicating the transmission origination of the facsimile data from the email reception processing unit 117. The transmission origination information may be, for example, a telephone number of the transmission origination.

In the next step, when the transfer determining unit 120 determines that the transmission origination identification information corresponding to the transmission origination information exists in the transmission origination column 132 of the transfer information table 130, the transfer determining unit 120 retrieves the transfer destination identification information stored in the transfer destination column 133 corresponding to the transmission origination identification information.

In the next step, the transfer data generation unit 122 generates transfer data for transferring the facsimile data thus received using the email. More specifically, for example, the transfer data generation unit 122 generates an electric mail with a destination identical to the transfer destination identified with the transfer destination identification information retrieved from the transfer destination column 133 as explained above. Then, the transfer data generation unit 122 attaches the facsimile data to the electric mail to generate the transfer data. The transfer data thus generated is transmitted to the email transmission processing unit 116 (refer to FIG. 1). Further, the received data store processing unit 121 stores the facsimile data thus received into the temporary storage unit 110.

On the other hand, when the transfer determining unit 120 determines that the transmission origination identification information corresponding to the transmission origination information does not exist in the transmission origination column 132 of the transfer information table 130 stored in the transfer information storage unit 109, the transfer control unit 119 completes the process. In this case, the facsimile unit 105 performs a process on the facsimile data thus received according to a setting determined in advance.

With reference to FIG. 1, in the embodiment, the print control unit 123 is provided for determining whether the facsimile data is to be printed when the transfer control unit 119 transfers the facsimile data. When the print control unit 123 determines that the facsimile data is to be printed, the print control unit 123 controls the printing unit 104 to print the image data contained in the facsimile data.

On the other hand, when the print control unit 123 determines that the facsimile data is not to be printed, the print control unit 123 determines whether the remaining storage capacity of the data storage unit 111 is sufficient. When the print control unit 123 determines that the remaining storage capacity of the data storage unit 111 is sufficient, the print control unit 123 stores the facsimile data into the data storage unit 111. When the print control unit 123 determines that the remaining storage capacity of the data storage unit 111 is not sufficient, after the print control unit 123 increases the storage capacity of the data storage unit 111, the print control unit 123 stores the facsimile data into the data storage unit 111. The print control unit 123 includes, for example, a transfer print determining unit 124 and a storage control unit 125.

In the embodiment, the transfer print determining unit 124 is provided for determining whether the print enable setting 112A stored in the print setting storage unit 112 is set to be printable when the transfer control unit 119 transfers the facsimile data. When the transfer print determining unit 124 determines that the print enable setting 112A is set to be printable, the transfer print determining unit 124 controls the printing unit 104 to print the image data contained in the facsimile data stored in the temporary storage unit 110. After the printing unit 104 prints the image data, the transfer print determining unit 124 deletes the facsimile data stored in the temporary storage unit 110.

On the other hand, when the transfer print determining unit 124 determines that the print enable setting 112A is set to be non-printable, the transfer print determining unit 124 controls the storage control unit 125 to determine whether the remaining storage capacity of the data storage unit 111 is sufficient. When the storage control unit 125 determines that the remaining storage capacity of the data storage unit 111 is sufficient, the transfer print determining unit 124 stores the facsimile data stored in the temporary storage unit 110 into the data storage unit 111.

On the other hand, when the storage control unit 125 determines that the remaining storage capacity of the data storage unit 111 is not sufficient, the transfer print determining unit 124 controls the printing unit 104 to perform the process indicated with the insufficient time process setting 112B stored in the print setting storage unit 112. When the insufficient time process setting 112B indicates the 1Job setting, for example, the transfer print determining unit 124 retrieves the facsimile data for the nJob portion from the data storage unit 111, and controls the printing unit 104 to print the image of the image data contained in the facsimile data for the 1Job portion. When the insufficient time process setting 112B indicates the nJob setting, the transfer print determining unit 124 retrieves the facsimile data for the nJob portion from the data storage unit 111, and controls the printing unit 104 to print the image of the image data contained in the facsimile data for the nJob portion. Then, the transfer print determining unit 124 deletes the facsimile data thus retrieved from the data storage unit 111.

In the embodiment, it is configured such that the transfer print determining unit 124 retrieves the facsimile data from the data storage unit 111 according to a predetermined rule. For example, the transfer print determining unit 124 may retrieve the facsimile data from one stored in the data storage unit 111 first (first-in first-out). Alternatively, the transfer print determining unit 124 may retrieve the facsimile data from one having a larger data size.

In the embodiment, the storage control unit 125 is provided for determining whether the remaining storage capacity of the data storage unit 111 is sufficient according to the instruction of the transfer print determining unit 124. For example, when the remaining storage capacity of the data storage unit 111 is smaller than a data size of one standard page per mode determined with a scanning line density of the facsimile data thus received, the storage control unit 125 determines that the remaining storage capacity of the data storage unit 111 is not sufficient. It is supposed that the storage unit 108 stores in advance the data size of one standard page per mode determined with the scanning line density of the facsimile data. Alternatively, the storage control unit 125 may determine that the remaining storage capacity of the data storage unit 111 is not sufficient when the remaining storage capacity of the data storage unit 111 is smaller than a data size of a plurality of pages determined in advance.

Further, the storage control unit 125 administers the remaining storage capacity information stored in the remaining storage capacity storage unit 113. For example, when the remaining storage capacity of the data storage unit 111 is changed, the storage control unit 125 updates the remaining storage capacity information to indicate the remaining storage capacity after the change. The NIF unit 126 is provided for transmitting and receiving the data through the network.

In the embodiment, the control unit 114 may be formed of a CPU (Central Processing Unit, not shown) for retrieving a specific program stored in the storage unit 108 and executing the program. The storage unit 108 may be formed of a storage device (not shown) such as an RAM (Random Access Memory), an ROM (Read Only Memory), a magnetic disk device, and the like to be controlled with the CPU. It is preferred that the transfer information storage unit 109, the data storage unit 111, the print setting storage unit 112, and the remaining storage capacity storage unit 113 are formed of the ROM or the magnetic disk device, and the temporary storage unit 110 is formed of the RAM.

Further, the data storage unit 111 may be formed of one storage device. The control unit 114 may be formed of hardware, i.e., an integrated logic IC such as ASIC (Application Specific Integrated Circuits), FPGA (Field Programmable Gate Array), and the like. Alternatively, the control unit 114 may be formed of software such as DSP (Digital Signal Processor) and the like.

Figure 4:
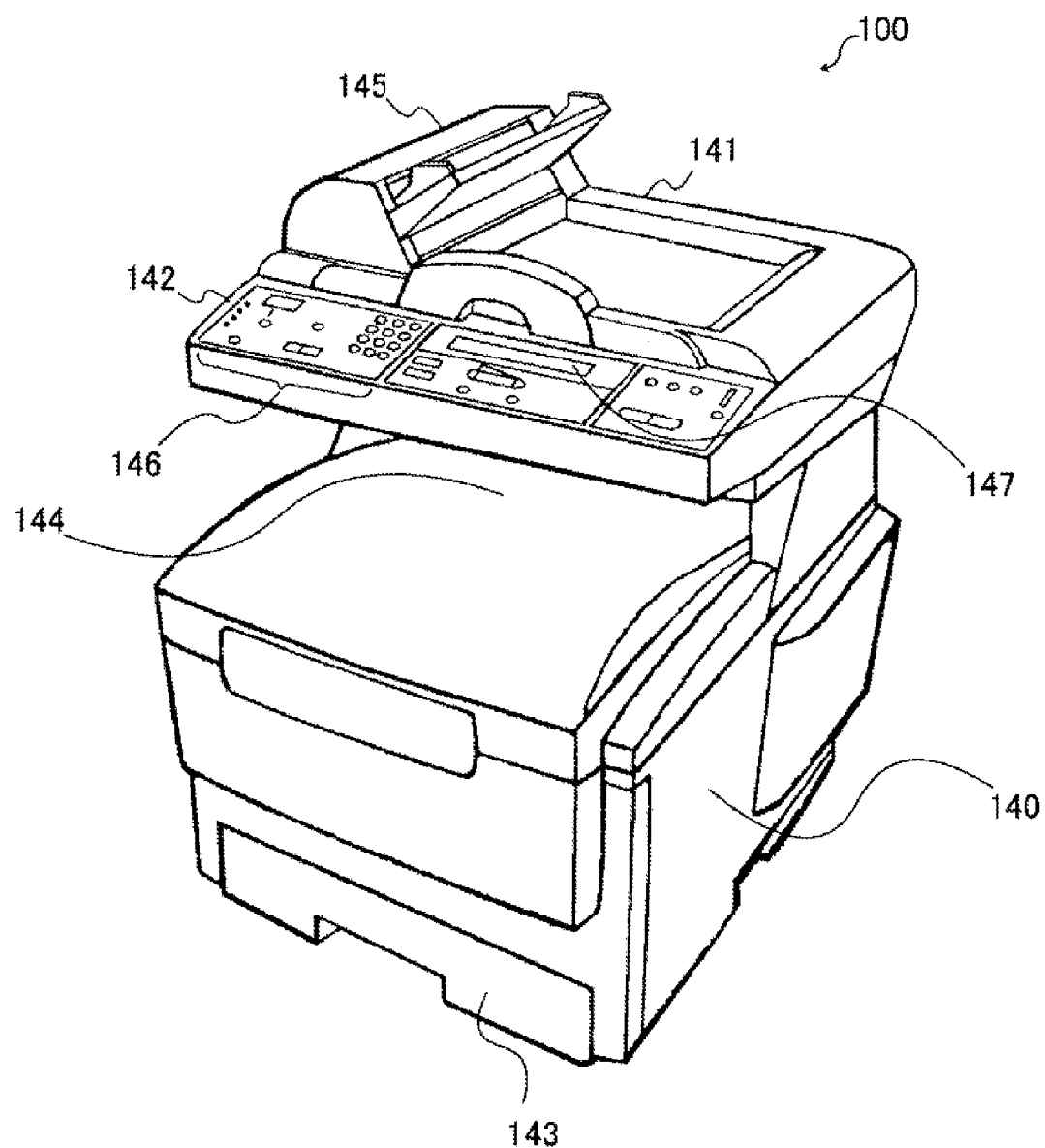
FIG. 4 is a perspective view showing an example of an outer appearance of the multifunction apparatus according to the first embodiment of the present invention.

FIG. 4 is a perspective view showing an example of an outer appearance of the multifunction apparatus 100 according to the first embodiment of the present invention. As shown in FIG. 4, the multifunction apparatus 100 includes an image forming apparatus 140; an image reading apparatus 141 disposed above the image forming apparatus 140; and a display operation apparatus 142 disposed in front of the image reading apparatus 141.

In the embodiment, the image forming apparatus 140 includes the printing unit 104; the facsimile unit 105; the storage unit 108; the control unit 114; and the NIF unit 126 shown in FIG. 1. A sheet supply portion 143 is disposed at a lower portion of the image forming apparatus 140 for supplying the recording sheet to the printing unit 104. A tray 144 is disposed at an upper portion of the image forming apparatus 140 for discharging the recording sheet thus printed.

In the embodiment, the image reading apparatus 141 includes the reading unit 103 shown in FIG. 1. An automatic original feeder 145 is disposed at an upper portion of the image reading apparatus 141 for feeding an original to the reading unit 103.

In the embodiment, the display operation apparatus 142 includes the operation unit 101 and the display unit 102 shown in FIG. 1. A plurality of keys 146 is disposed in the display operation apparatus 142. The keys 146 include various input keys, a start key for instructing start of a process, a stop key for instructing stop of a process, an address book key for instructing a mail address, and a file name change key for changing a file name. Further, the display operation apparatus 142 is provided with a display 147 for displaying a screen. The display 147 displays a transmission destination list screen for specifying the transmission destination to which the image data is transmitted, a setting screen for setting a scanning condition and a data transmission condition, and the like.

Figure 5:
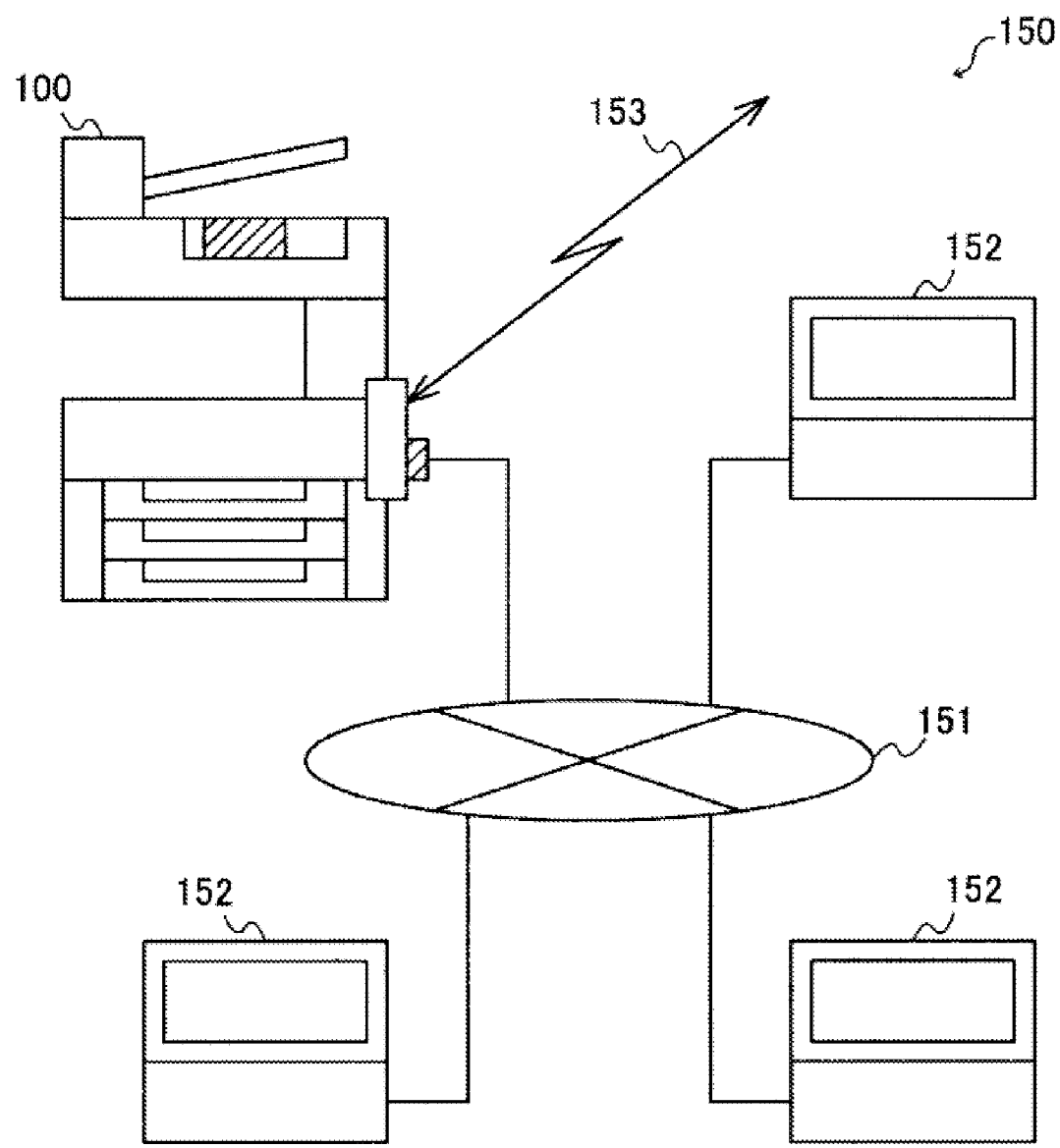
FIG. 5 is a schematic diagram showing a configuration of an information processing system including the multifunction apparatus according to the first embodiment of the present invention.

FIG. 5 is a schematic diagram showing a configuration of an information processing system 150 including the multifunction apparatus 100 according to the first embodiment of the present invention. As shown in FIG. 5, the multifunction apparatus 100 is connected to a network 151. Further, a server 152 is connected to the network 151, so that the multifunction apparatus 100 is capable of performing network communication with the server 152. For example, the multifunction apparatus 100 is capable of transmitting the image data input thereto to the server 152, printing the electric mail with an attached filed thus received, or transferring the electric mail to the server 152. The network communication may be performed through a wire or wireless.

In the embodiment, after the image data is transferred to the server 152, the user can print the image data as necessary. Further, the multifunction apparatus 100 is connected to a network 153. A communication device (not shown) is connected to the network 153, so that the multifunction apparatus 100 is capable of performing facsimile communication with the communication device.

Figure 6:
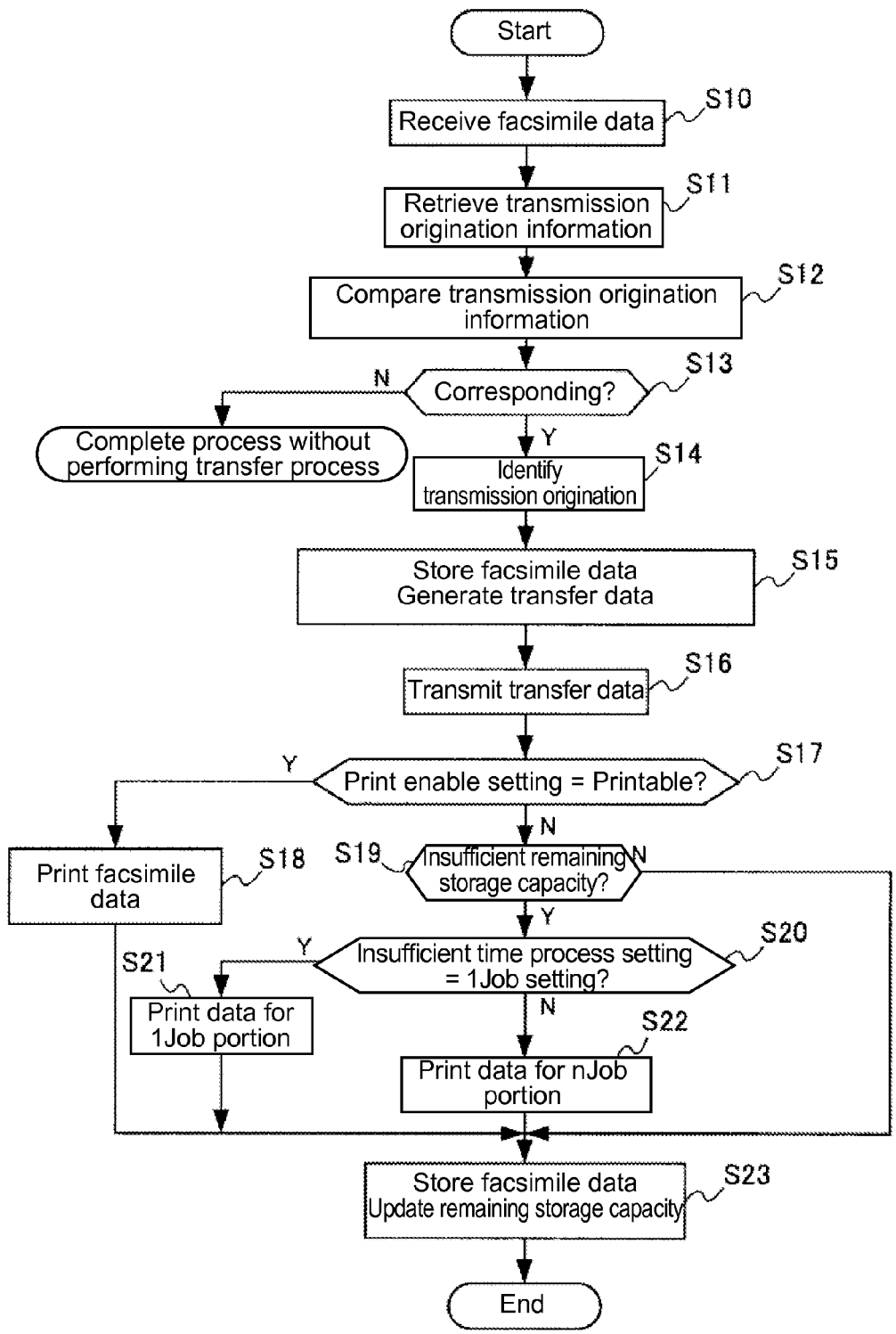
FIG. 6 is a flow chart showing an operation of the multifunction apparatus when the multifunction apparatus receives facsimile data according to the first embodiment of the present invention.

FIG. 6 is a flow chart showing an operation of the multifunction apparatus 100 when the multifunction apparatus 100 receives the facsimile data according to the first embodiment of the present invention.

In step S10, the facsimile receiving unit 107 receives the facsimile data. In step S11, the transfer determining unit 120 retrieves the transmission origination information indicating the transmission origination of the facsimile data received in step S10 from the facsimile receiving unit 107. In this case, it is supposed that the transmission origination information is a telephone number of the transmission origination.

In step S12, the transfer determining unit 120 compares the transmission origination information retrieved in step S11 with the transmission origination information stored in the transfer information table 130 stored in the transfer information storage unit 109. In step S13, the transfer determining unit 120 determines whether the transmission origination information corresponding to the transmission origination is stored in the transfer information table 130. When the transfer determining unit 120 determines that the transmission origination information corresponding to the transmission origination is stored in the transfer information table 130 (Yes in step S13), the process proceeds to step S14. In step S14, the transmission origination is identified.

When the transfer determining unit 120 determines that the transmission origination information corresponding to the transmission origination is not stored in the transfer information table 130 (No in step S13), the transfer determining unit 120 completes the process without performing the transfer process. When the transfer determining unit 120 completes the process without performing the transfer process, the facsimile unit 105 performs the process determined in advance on the facsimile data. For example, the facsimile unit 105 may retrieve the image data from the facsimile data and send the image data to the printing unit 104, so that the printing unit 104 prints the image of the image data.

In step S15, the transfer data generation unit 122 retrieves the mail address of the transfer destination related with the transmission origination identification information corresponding to the transmission origination information retrieved in step S11. Then, the transfer data generation unit 122 generates the electric mail with the mail address thus retrieved as the destination. In step S15, the transfer data generation unit 122 attaches the facsimile data received in step S10 to the electric mail to generate the transfer data. Further, the transfer data generation unit 122 transmits the transfer data to the email transmission processing unit 116, and the transfer determining unit 120 stores the facsimile data received in step S10 in the temporary storage unit 110.

In step S16, after the transfer data generation unit 122 transmits the transfer data to the email transmission processing unit 116, the email transmission processing unit 116 transmits the transfer data to the NIF unit 126, so that the NIF unit 126 transmits the transfer data to the network 151.

In step S17, the transfer print determining unit 124 determines whether the print enable setting 112A contained in the print setting 112C stored in the print setting storage unit 112 is set to be printable. When the transfer print determining unit 124 determines that the print enable setting 112A is set to be printable (Yes in step S17), the process proceeds to step S18. In step S18, the transfer print determining unit 124 controls the printing unit 104 to print the image data contained in the facsimile data stored in the temporary storage unit 110. When the transfer print determining unit 124 determines that the print enable setting 112A is set to be non-printable (No in step S17), the process proceeds to step S19.

In step S19, the storage control unit 125 determines whether the remaining storage capacity of the data storage unit 111 is insufficient. When the storage control unit 125 determines that the remaining storage capacity of the data storage unit 111 is insufficient (Yes in step S17), the process proceeds to step S20. On the other hand, when the storage control unit 125 determines that the remaining storage capacity of the data storage unit 111 is not insufficient (No in step S17), the process proceeds to step 23.

In step S20, the transfer determining unit 120 determines whether the insufficient time process setting 112B contained in the facsimile setting stored in the print setting storage unit 112 indicates the 1Job setting. When the transfer determining unit 120 determines that the insufficient time process setting 112B indicates the 1Job setting (Yes in step S20), the process proceeds to step S21. When the transfer determining unit 120 determines that the insufficient time process setting 112B does not indicate the 1Job setting (No in step S20), in other words, the insufficient time process setting 112B indicates the nJob setting, the process proceeds to step S21.

In step S21, the transfer print determining unit 124 retrieves the facsimile data for the 1Job portion from the data storage unit 111, and controls the printing unit 104 to print the image of the image data contained in the facsimile data for the 1Job portion. Then, the transfer print determining unit 124 deletes the facsimile data thus retrieved from the data storage unit 111.

In step S22, the transfer print determining unit 124 retrieves the facsimile data for the nJob portion from the data storage unit 111, and controls the printing unit 104 to print the image of the image data contained in the facsimile data for the nJob portion. Then, the transfer print determining unit 124 deletes the facsimile data thus retrieved from the data storage unit 111.

In step S23, the transfer determining unit 120 stores the facsimile data stored in the temporary storage unit 110 into the data storage unit 111. In this step, the storage control unit 125 updates the remaining storage capacity indicated with the remaining storage capacity information stored in the remaining storage capacity storage unit 113.

As explained above, in the embodiment, when the remaining storage capacity is insufficient, the image data contained in the facsimile data already stored is printed. Then, the facsimile data is deleted to increase the storage capacity. Accordingly, it is possible to prevent the facsimile data from being stored due to the insufficient remaining storage capacity.

In the flow chart shown in FIG. 6, after steps S21 and S22 are performed, the process proceeds to step S23, so that the facsimile data thus received is stored. Alternatively, after steps S21 and S22 are performed, the remaining storage capacity may be updated, and the process returns to step S19, so that it is confirmed that the remaining storage capacity is sufficient. With the sequence, even when the data size of the facsimile data thus deleted is smaller than the data size of the facsimile data newly received, and the remaining storage capacity is still insufficient for storing the facsimile data newly received into the data storage unit 111, the facsimile data is repeatedly printed and deleted until the remaining storage capacity becomes sufficient. Accordingly, the number of jobs to be printed is determined according to the remaining storage capacity, so that it is possible to minimize the data to be deleted, and secure the remaining storage capacity.

Second Embodiment

A second embodiment of the present invention will be explained next. In the first embodiment, when the user sets not to print the facsimile data, the facsimile data is not printed. In the second embodiment, the facsimile data is not printed when the user is absent as well.

Figure 7:
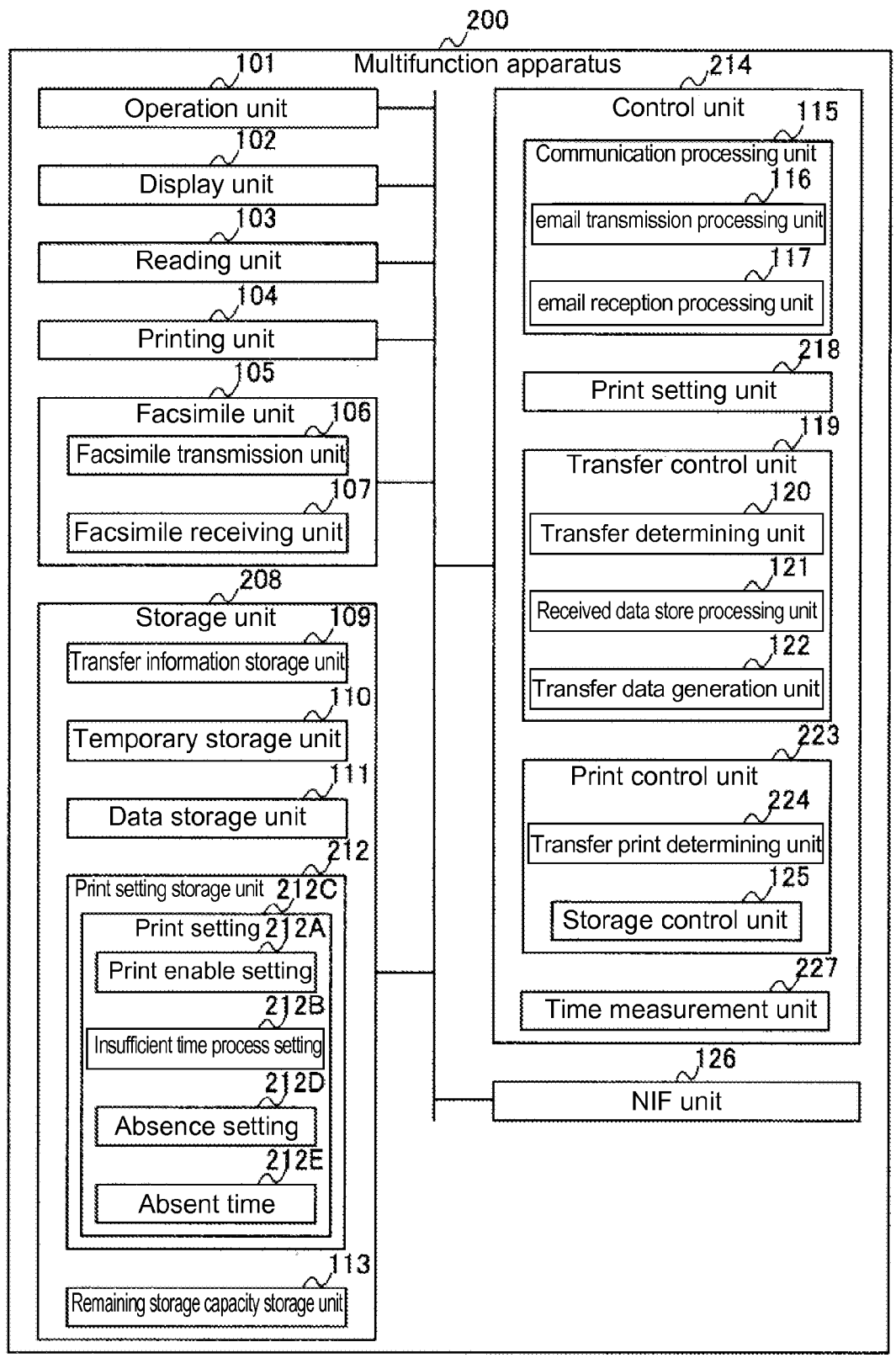
FIG. 7 is a block diagram showing a configuration of a multifunction apparatus according to a second embodiment of the present invention.

FIG. 7 is a block diagram showing a configuration of a multifunction apparatus 200 according to the second embodiment of the present invention.

As shown in FIG. 7, the multifunction apparatus 200 includes the operation unit 101; the display unit 102; the reading unit 103; the printing unit 104; the facsimile unit 105; a storage unit 208; a control unit 214; and the network interface unit (referred to as an NIF unit) 126. In the multifunction apparatus 200 in the second embodiment, the storage unit 208 stores information different from that of the multifunction apparatus 100 in the first embodiment, and the control unit 214 performs a process different from that of the multifunction apparatus 100 in the first embodiment.

In the second embodiment, the storage unit 208 includes the transfer information storage unit 109, the temporary storage unit 110, the data storage unit 111, a print setting storage unit 212, and the remaining storage capacity storage unit 113. In the storage unit 208 in the second embodiment, the print setting storage unit 212 stores information different from that of the storage unit 108 in the first embodiment.

In the second embodiment, the print setting storage unit 212 is provided for storing a print setting 212C. The print setting 212C includes a print enable setting 212A indicating whether the image of the image data included in the facsimile data received with the facsimile receiving unit 107 is to be printed. The print setting 212C further includes an insufficient time process setting 212B indicating a process when the print enable setting 112A is set to not print the image data and the remaining storage capacity of the data storage unit 111 is insufficient. Further, the print setting 212C further includes an absence setting 212D indicating whether the image of the image data included in the facsimile data received with the facsimile receiving unit 107 is to be printed when the user of the multifunction apparatus 200 is absent. The print setting 212C further includes an absent time 212E indicating a time during which the user is absent when the absence setting 212D is set to not print the image data.

In the second embodiment, the control unit 214 includes the communication processing unit 115, a print setting unit 218, the transfer control unit 119, a print control unit 223, and a time measurement unit 227. In the control unit 214 in the second embodiment, the print setting unit 218 and the print control unit 223 perform a process different from that of the control unit 114 in the first embodiment. Further, the control unit 214 is provided with the time measurement unit 227.

In the second embodiment, the print setting unit 218 is provided for controlling a process of generating or updating the print setting 112C, and storing the print setting 112C in the print setting storage unit 112. The print setting unit 218 displays, for example, a print setting screen on the display unit 102. The user selects whether the image of the image data contained in the facsimile data is to be printed, inputs the process when the remaining storage capacity is insufficient, selects whether the image of the image data contained in the facsimile data is to be printed when the user is absent, and inputs the absent time 212E through the print setting screen.

More specifically, the print setting unit 218 is arranged to prompt the user to select whether the image of the image data contained in the facsimile data is to be printed, select whether the 1job portion or the nJob portion is printed when the remaining storage capacity is insufficient, input the value of n when the nJob portion is printed, select whether the image of the image data contained in the facsimile data is to be printed when the user is absent, and input an absence starting time and an absence ending time through the print setting screen and the operation unit 101. According to the input of the user, the print setting unit 218 generates or updates the print setting 112C.

In the second embodiment, a transfer print determining unit 224 is provided for determining whether the absence setting 212D stored in the print setting storage unit 212 is set to be printable before determining whether the print enable setting 212A stored in the print setting storage unit 212 is set to be printable. When the transfer print determining unit 124 determines that the absence setting 212D stored in the print setting storage unit 212 is set to be non-printable and a current time is included in the absent time 212E, the transfer print determining unit 224 sets the print enable setting 212A to be non-printable. On the other hand, when a current time is not included in the absent time 212E, the transfer print determining unit 224 sets the print enable setting 212A to be printable. When the transfer print determining unit 124 determines that the absence setting 212D stored in the print setting storage unit 212 is set to be printable, the print setting storage unit 212 performs a process similar to that in the first embodiment.

In the second embodiment, the time measurement unit 227 is provided for measuring a period of time and detecting a time and a date. It is noted that the multifunction apparatus 200 recognizes the time and the data detected with the time measurement unit 227 as a current time.

Figure 8:
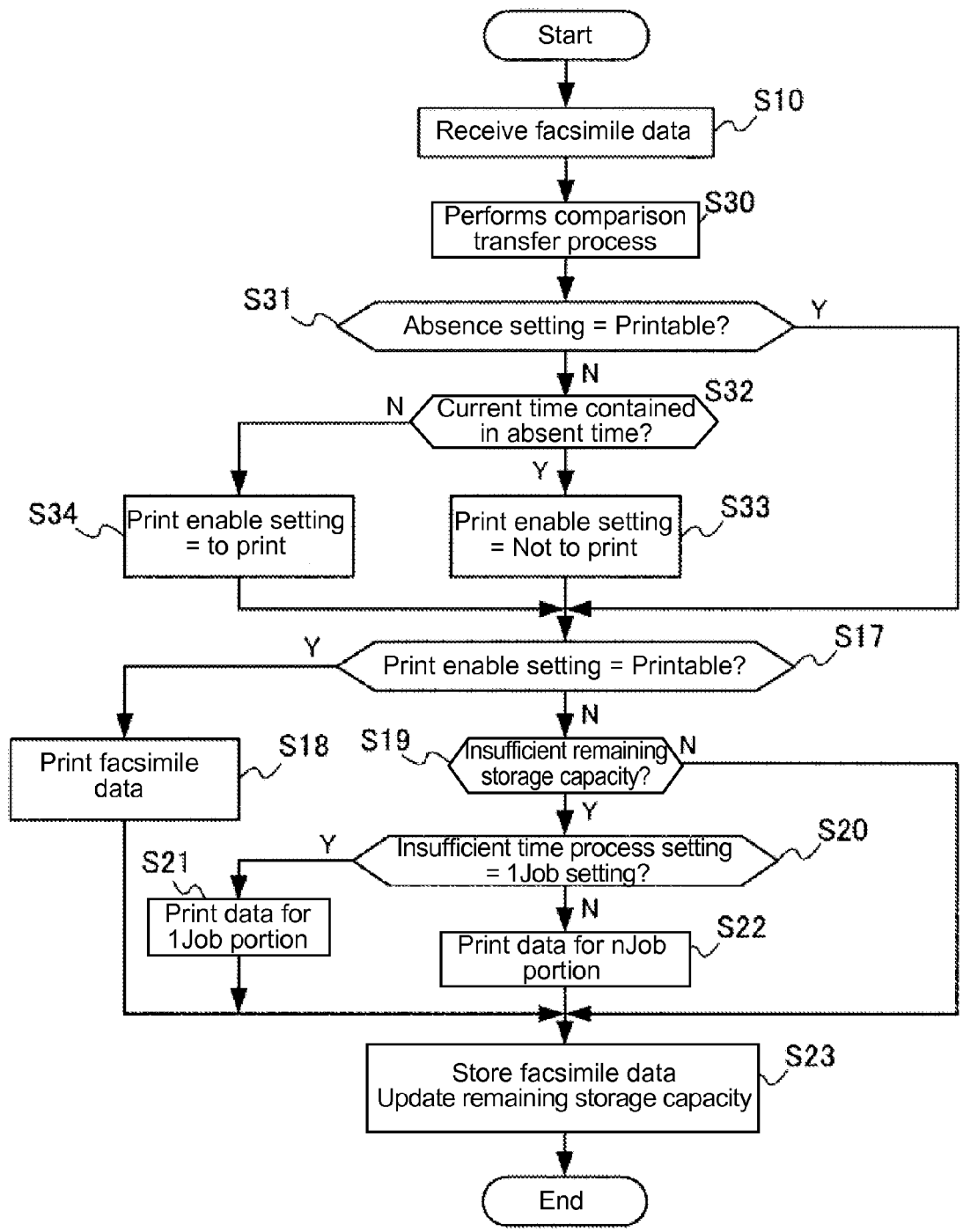
FIG. 8 is a flow chart showing an operation of the multifunction apparatus when the multifunction apparatus receives facsimile data according to the second embodiment of the present invention.

FIG. 8 is a flow chart showing an operation of the multifunction apparatus 200 when the multifunction apparatus 200 receives the facsimile data according to the second embodiment of the present invention. In the flow chart shown in FIG. 8, steps of performing processes similar to those in the flow chart shown in FIG. 6 are designated with the same reference numerals.

In step S10, the facsimile receiving unit 107 receives the facsimile data. In step S30, the multifunction apparatus 200 performs a comparison transfer process. In the comparison transfer process, steps S11 to S16 in the flow chart shown in FIG. 6 are performed.

In step S31, the transfer print determining unit 224 determines whether the absence setting 212D contained in the print setting 212C stored in the print setting storage unit 212 is set to be printable. When the transfer print determining unit 124 determines that the absence setting 212D is set not to be printable (No in step S31), the process proceeds to step S32. When the transfer print determining unit 124 determines that the absence setting 212D is set to be printable (Yes in step S31), the process proceeds to step S17.

In step S32, the transfer print determining unit 224 retrieves the current time from the time measurement unit 227, and determines whether the current time is contained in the absent time 212E contained in the print setting 212C stored in the print setting storage unit 212. When the transfer print determining unit 124 determines that the current time is contained in the absent time 212E (Yes in step S32), the process proceeds to step S33. When the transfer print determining unit 124 determines that the current time is not contained in the absent time 212E (No in step S32), the process proceeds to step S34.

In step S33, the transfer print determining unit 224 updates the print enable setting 212A contained in the print setting 212C stored in the print setting storage unit 212, so that the print enable setting 212A is set not to print. In step S34, the transfer print determining unit 224 updates the print enable setting 212A contained in the print setting 212C stored in the print setting storage unit 212, so that the print enable setting 212A is set to print. The process from step S17 to step S23 is the same as that from step S17 to step S23 shown in FIG. 6.

As explained above, in the second embodiment, when the user is absent, the print enable setting 212A is set not to print. Accordingly, it is possible to prevent the image of the image data contained in the facsimile data from being printed when the user is absent.

In the second embodiment, when the absence setting 212D is set not to print when the user is absent, the print setting unit 218 may be configured such that the print enable setting 212A before the absent time 212E is stored in the storage unit 208. Then, after the absent time 212E is elapsed, the print enable setting 212A is returned to the state before the absent time 212E (the state represented with the print enable setting stored in the storage unit 208).

In the first and second embodiments described above, when the facsimile data is transferred to other device such as the server 152 and the like, it is determined whether the facsimile data is to be printed. The present invention is not limited thereto, and it may be configured such that it is determined whether the facsimile data is to be printed when the facsimile data is not transferred to other device such as the server 152 and the like. In this case, it is not necessary to perform the process from step S11 to step S16 shown in FIG. 6 and the process of step S30 shown in FIG. 8.

In the first and second embodiments described above, when the remaining storage capacity is insufficient, one of the 1job setting and the nJob setting is selected, and the present invention is not limited thereto. When the remaining storage capacity is insufficient, it may be configured such that the image of the image data contained in all of the facsimile data stored in the data storage unit 111 is selected (for example, an allJob setting).

Further, for example, when the storage control unit 125 determines that the remaining storage capacity is insufficient, it may be configured such that the number of jobs to be printed is determined according to an insufficient amount of the storage capacity obtained by subtracting the remaining storage capacity from the data size of one standard page or a plurality of pages per mode determined with the scanning line density of the facsimile data. Further, when the insufficient amount increases, it may be configured such that the number of jobs to be printed increases. Accordingly, it is possible to perform the printing operation just for the insufficient amount of the storage capacity, thereby making it possible to prevent unnecessary recording sheets such as paper from being output.

In the first and second embodiments described above, when the remaining storage capacity of the data storage unit 111 is smaller than the data size of one standard page per mode determined with a scanning line density of the facsimile data thus received, the storage control unit 125 determines that the remaining storage capacity of the data storage unit 111 is not sufficient, and the present invention is not limited thereto. For example, when the remaining storage capacity is smaller the data size of the facsimile data thus received, the storage control unit 125 may determine that the remaining storage capacity is not sufficient. In this case, it may be configured such that the number of jobs to be printed is determined according to an insufficient amount obtained by subtracting the storage capacity from the data size of the facsimile data thus received. Further, when the insufficient amount increases, it may be configured such that the number of jobs to be printed increases.

In the first and second embodiments described above, the multifunction apparatus 100 or the multifunction apparatus 200 is configured to transmit the electric mail with the facsimile data attached thereto to the server 152 (refer to FIG. 5), and it is not necessary to transmit the electric mail. For example, it may be configured such that the facsimile data is transmitted to the server 152 according to FTP (File Transfer Protocol) or HTTP (Hyper Text Transfer Protocol).

In the first and second embodiments described above, the present invention is applied to the multifunction apparatus 100 and the multifunction apparatus 200, and is not limited thereto. The present invention may be applicable to a facsimile apparatus or an information processing apparatus such as an image forming apparatus such as a printer.

In the first and second embodiments described above, when the print enable setting 112A or the print enable setting 212A is set not to print, and it is determined that the remaining storage capacity is not sufficient, the facsimile data is printed according to the insufficient time process setting 112B or the insufficient time process setting 212B (the 1Job setting or the nJob setting). Alternatively, when the print enable setting 112A or the print enable setting 212A is set not to print, and it is determined that the remaining storage capacity is not sufficient, a print setting updating process may be performed for updating the print enable setting 112A or the print enable setting 212A to print, so that the facsimile data is printed according to the insufficient time process setting 112B or the insufficient time process setting 212B (the 1Job setting or the nJob setting). In this case, it may be configured such that the setting of printing all jobs to the insufficient time process setting 112B or the insufficient time process setting 212B, or the number of jobs to be printed is determined according to the insufficient amount of the remaining storage capacity.

As described above, in the second embodiment of the present invention, the information processing apparatus includes the receiving unit for receiving the data; the printing unit for printing the data; the data storage unit for storing the data; the print setting storage unit for storing the print enable setting indicating whether the data received with the receiving unit is printed; and the print control unit for performing the print setting updating process to change the print enable setting to print the data when the print enable setting is not set to print the data and it is determined that the remaining storage capacity of the data storage unit is not sufficient.

The disclosure of Japanese Patent Application No. 2010-199142, filed on Sep. 9, 2010, is incorporated in the application by reference.

While the invention has been explained with reference to the specific embodiments of the invention, the explanation is illustrative and the invention is limited only by the appended claims.

What is claimed is:

1. An information processing apparatus, comprising:
a receiving unit configured to receive data;
a printing unit configured to print the data;
a data storage unit configured to store the data received with the receiving unit;
an operation unit configured to set a print enable setting indicating whether the data received with the receiving unit is to be printed or the data received with the receiving unit is to be stored in the data storage unit;
a print setting storage unit configured to store the print enable setting set with the operation unit; and
a print control unit configured to control the printing unit to print the data stored in the data storage unit when the print enable setting stored in the print setting storage unit indicates that the data received with the receiving unit is to be stored in the data storage unit and it is determined that a remaining storage capacity of the data storage unit is not sufficient.

2. The information processing apparatus according to claim 1, wherein said print control unit is arranged to delete the data printed with the printing unit from the data storage unit, and to store the data received with the receiving unit into the data storage unit.

3. The information processing apparatus according to claim 1, wherein said print control unit is arranged to control the printing unit to print the data of one job.

4. The information processing apparatus according to claim 1, wherein said print control unit is arranged to control the printing unit to print the data of an n number of jobs, wherein the n is a natural number.

5. The information processing apparatus according to claim 4, wherein said print control unit is arranged to control the printing unit to print the data of the n number of jobs, wherein the n is specified by a user.

6. The information processing apparatus according to claim 1, wherein said print control unit is arranged to control the printing unit to print all of the data stored in the data storage unit.

7. The information processing apparatus according to claim 1, wherein said print control unit is arranged to determine a number of jobs to be printed with the printing unit according to an insufficient amount of the remaining storage capacity.

8. The information processing apparatus according to claim 1, wherein said print control unit is arranged to control the printing unit to print from one of the data stored first in the data storage unit.

9. The information processing apparatus according to claim 1, wherein said print control unit is arranged to calculate the remaining storage capacity by subtracting a total storage amount of the data stored in the data storage unit from a storage capacity of the data storage unit.

10. The information processing apparatus according to claim 1, wherein said print control unit is arranged to determine that the remaining storage capacity is not sufficient when the remaining storage capacity is smaller than a data size determined in advance.

11. The information processing apparatus according to claim 10, wherein said data size is determined per mode of receiving the data with the receiving unit.

12. The information processing apparatus according to claim 1, further comprising a time measurement unit for detecting a time, said print setting storage unit being arranged to store an absence setting indicating whether the data received with the receiving unit is to be printed at a period of time when a user is absent and an absent time indicating the period of time when the user is absent, said print control unit being arranged to set the absent setting not to print the data when the time measured with the time measurement unit is contained in the period of time, said print control unit being arranged to set the absent setting to print the data when the time measured with the time measurement unit is not contained in the period of time.

13. The information processing apparatus according to claim 1, further comprising a network interface unit connected to a network and a transfer control unit for performing a transfer process of transferring the data through the network interface unit when the receiving unit receives the data, said print control unit being arranged to control the printing unit when the transfer control unit performs the transfer process.

14. The information processing apparatus according to claim 13, further comprising a transfer information storage unit for storing transfer information indicating a transmission origination and a transfer destination to which the data transmitted from the transmission origination is transferred, said transfer control unit being arranged to perform the transfer process when the transmission origination of the data received with the receiving unit is contained in the transfer information.

15. The information processing apparatus according to claim 1, wherein said information processing apparatus is a multifunction apparatus.

16. The information processing apparatus according to claim 1, wherein said information processing apparatus is a facsimile.

17. The information processing apparatus according to claim 1, wherein said operation unit is configured to set a print condition when it is determined that the remaining storage capacity of the data storage unit is not sufficient.

18. The information processing apparatus according to claim 1, wherein said control unit is arranged to output the stored data stored in the data storage unit outside the information processing apparatus when a remaining data capacity of the data storage unit is less than a specific data size.

19. An information processing apparatus, comprising:
   a receiving unit configured to receive data;
   a data storage unit configured to store the data received with the receiving unit;
   an operation unit configured to set an output setting indicating whether the data received with the receiving unit is to be output outside the information processing apparatus or the data received with the receiving unit is to be stored in the data storage unit;
   a output setting storage unit configured to store the output setting set with the operation unit; and
   a control unit configured to control the data stored in the data storage unit to be output outside the information processing apparatus when the output setting stored in the output setting storage unit indicates that the data received with the receiving unit is to be stored in the data storage unit and it is determined that an amount of data stored in the data storage unit exceeds a threshold value determined in advance.

20. The information processing apparatus according to claim 19, wherein said operation unit is configured to set the output setting when a remaining data capacity of the data storage unit is not sufficient.

21. The information processing apparatus according to claim 19, wherein said control unit is configured to delete the stored data output outside the information processing apparatus from the data storage unit.

22. The information processing apparatus according to claim 19, wherein said control unit is arranged to output data of an n number of jobs from the stored data stored in the data storage unit, wherein the n is a natural number.

23. The information processing apparatus according to claim 19, further comprising a printing unit configured to print the data received with the receiving unit or the stored data stored in the data storage unit,
   wherein said control unit is configured to output the stored data stored in the data storage unit outside the information processing apparatus through controlling the printing unit to print the stored data.

24. The information processing apparatus according to claim 19, wherein said control unit is arranged to output the stored data stored in the data storage unit outside the information processing apparatus from one of the stored data having a large data size.

25. The information processing apparatus according to claim 19, wherein said control unit is arranged to output all of the data stored in the stored data storage unit outside the information processing apparatus.

26. The information processing apparatus according to claim 19, further comprising a time measurement unit for detecting a time, said output setting storage unit being arranged to store an absence setting indicating whether the data received with the receiving unit is to be output at a period of time when a user is absent and an absent time indicating the period of time when the user is absent, said control unit being arranged to set the absent setting not to output the data when the time measured with the time measurement unit is contained in the period of time, said control unit being arranged to set the absent setting to output the data when the time measured with the time measurement unit is not contained in the period of time.

27. The information processing apparatus according to claim 19, wherein said information processing apparatus is a multifunction apparatus.

28. The information processing apparatus according to claim 19, wherein said information processing apparatus is a facsimile.

* * * * *